Aug. 25, 1942.  L. B. JONES  2,294,304
MASTER CONTROL FOR FLUID DISTRIBUTORS
Filed Nov. 19, 1941  8 Sheets-Sheet 3

INVENTOR:
Lloyd B. Jones,
BY
ATTORNEYS.

Aug. 25, 1942.   L. B. JONES   2,294,304
MASTER CONTROL FOR FLUID DISTRIBUTORS
Filed Nov. 19, 1941   8 Sheets-Sheet 7

FIG_14_

FIG_15_

INVENTOR:
Lloyd B. Jones,
BY
ATTORNEYS.

Patented Aug. 25, 1942

2,294,304

UNITED STATES PATENT OFFICE 2,294,304

MASTER CONTROL FOR FLUID DISTRIBUTORS

Lloyd B. Jones, Hollidaysburg, Pa.

Application November 19, 1941, Serial No. 419,725

20 Claims. (Cl. 121—126)

This invention generally relates to means for controlling the admission and exhaust of motive fluid to the cylinders of reciprocating engines and, more particularly, to means preferably applicable to fluid actuated locomotives of the species disclosed in a prior application for patent, Serial No. 253,296, filed by the present applicant, January 28, 1939, allowed March 28, 1941; and which later matured as U. S. Patent No. 2,260,458, dated October 28, 1941.

The primary aim of the instant improvements is the provision of an improved cam drive and centrifugal lead adjustment means for the motive fluid feed supply and exhaust valves of reciprocating engines.

Another aim of this invention is the provision of a novel cam shaft drive spline, and centrifugal self-adjusting governor, for the pilot means controlling the opening and closing of the cylinder poppet valves of steam operated locomotives, said controlling means being capable of both manual and automatic self-adjustment conformable to forward speed variations of the locomotive, and reversal thereof.

While the above definitions are briefly indicative, in a general way, of the aims of this invention, other objects with ancillary advantages will become apparent to those skilled in the art upon a full understanding of the construction, arrangement and operation of the means hereinafter explained in connection with the accompanying drawings. However, it will be also appreciated that said invention is susceptible of other embodiments, or structurally modified forms, coming equally well within the terms and scope of the concluding claims.

In the accompanying drawings:

Fig. 1 is a somewhat diagrammatic plan view of spaced locomotive cylinders having a master control cam shaft drive spline means and centrifugal lead adjusting device, in accordance with this invention, for positively controlling the action of the inlet and exhaust poppet valves.

Fig. 1ᵃ is a diagrammatic side view illustrative of means operatively connecting the cylinder pistons to a driver axle of the locomotive, and said axle to the improved cam drive and centrifugal lead adjustment means of this invention: and Fig. 1ᵇ is a plan view of the same.

In describing the form of this invention exemplified in the above captioned eight sheets of illustrative drawings, specific terms will be employed for the sake of clarity, but it is to be understood the scope of said invention is not thereby limited, each such term being deemed to embrace all reasonable equivalents which perform the same function for an analogous purpose.

Figures 1, 1A, 1B:
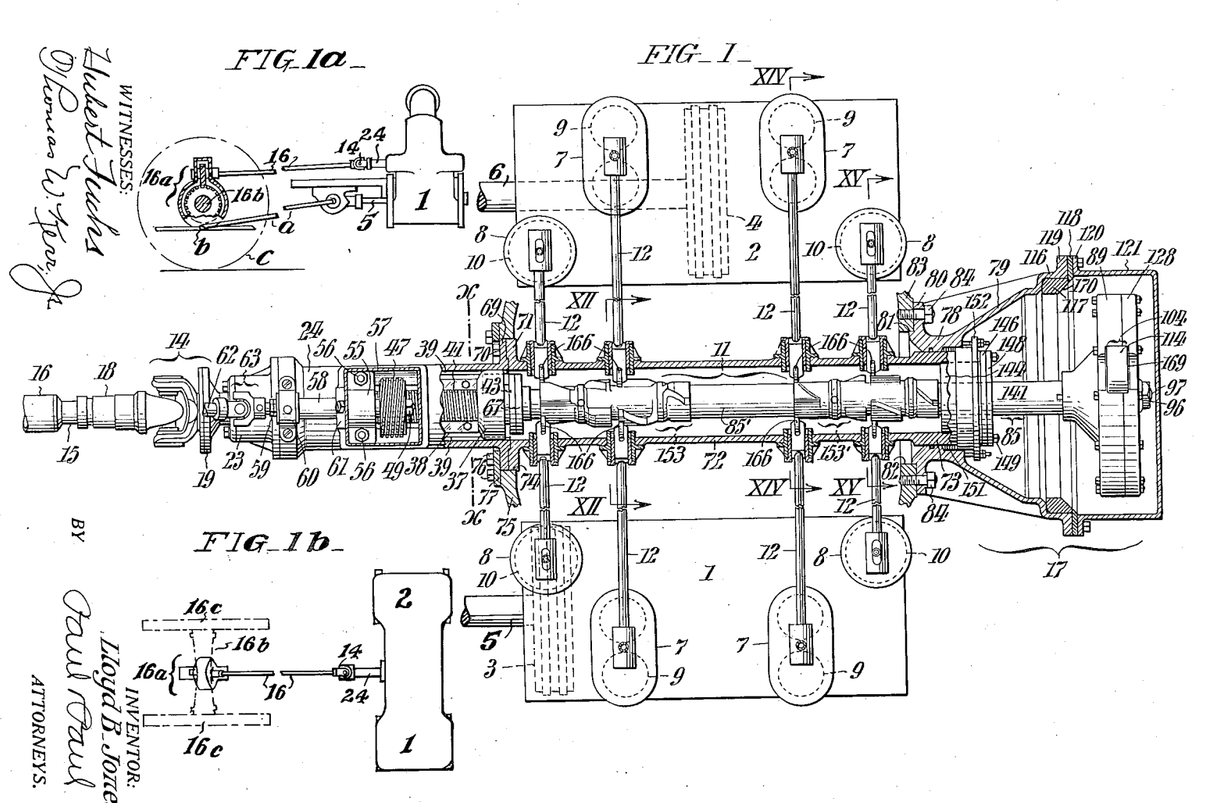

Referring more in detail to the drawings, and firstly to Fig. 1 which illustrates a preferred location for the means of this invention relative to the main or double-acting right and left-hand cylinders 1, 2 of a conventional type steam locomotive, the respective cylinders have pistons 3, 4 and associated piston rods 5, 6, with connecting rods $a$ Fig. 1$^a$, only one being visible, and crank means $b$ to the adjoining driving wheel $c$. Each cylinder 1, 2 is provided with pairs of casings 7, 8, respectively housing the admission and exhaust or poppet valves 9, 10, which are, in turn, actuated by the master controller or cam means comprehensively designated 11, through the medium of longitudinally slidable rods 12, as hereinafter again referred to. The master controller or cam means 11 is, preferably, as shown in Figs. 1$^a$ and 1$^b$, coordinated at one end, by a helical driving spline 13, universal 14, stub shaft 15, coupler 16 and suitable gearing, 16$a$, with a driving axle 16$b$, of the locomotive, for continuous rotation thereby; and all as readily understandable by those conversant with the art, or on reference to Sheet 1 of the drawings in the hereinbefore identified prior patent. At the other end of the cam means 11 is the novel governor or centrifugal device generally designated 17, of this invention.

Figure 2:
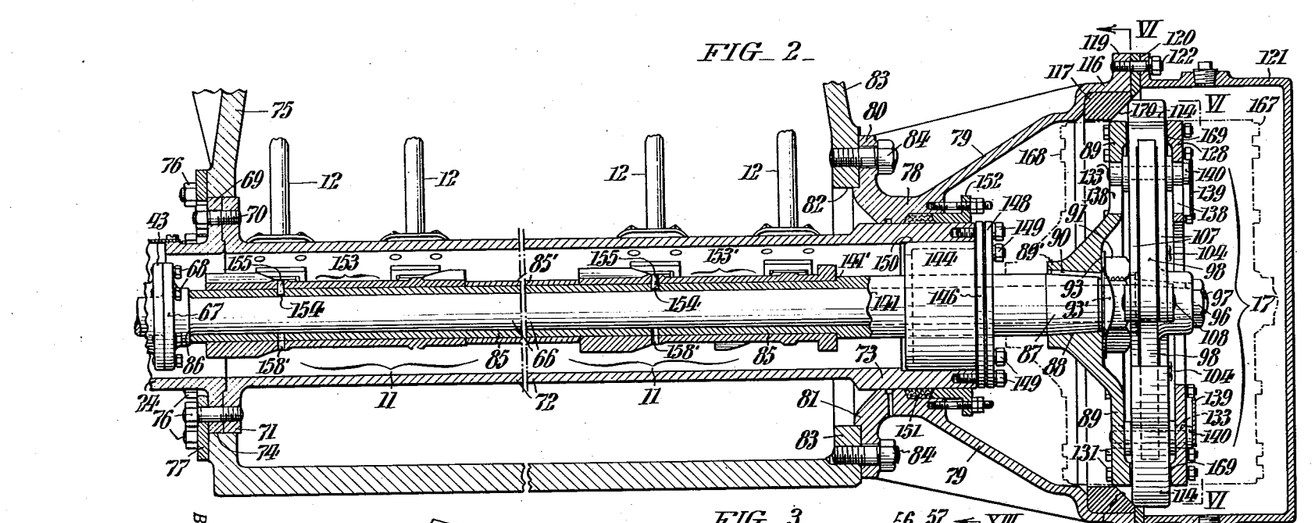
Fig. 2 is an axial longitudinal section through the cam means for operating the inlet and exhaust poppet valves as well as the associated centrifugal or governor device, or that portion of the means illustrated to the right-hand of the plane indication x—x in Fig. 1, said section being drawn to larger scale, with an intermediate portion broken out, for clearer illustration of important details.
Figure 3:
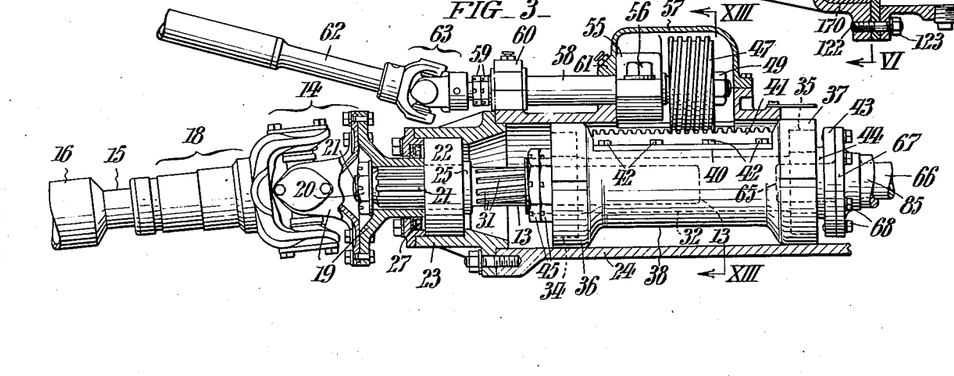
Fig. 3 is a similar, but unbroken, section of that portion of the means shown to the left-hand of the plane indication x—x in Fig. 1, or including the cam shaft drive spline means of this invention, together with a portion of the connection to the locomotive drive axle as well as the means for effecting cut-off adjustments and reversals from the locomotive cab.
Figure 4:
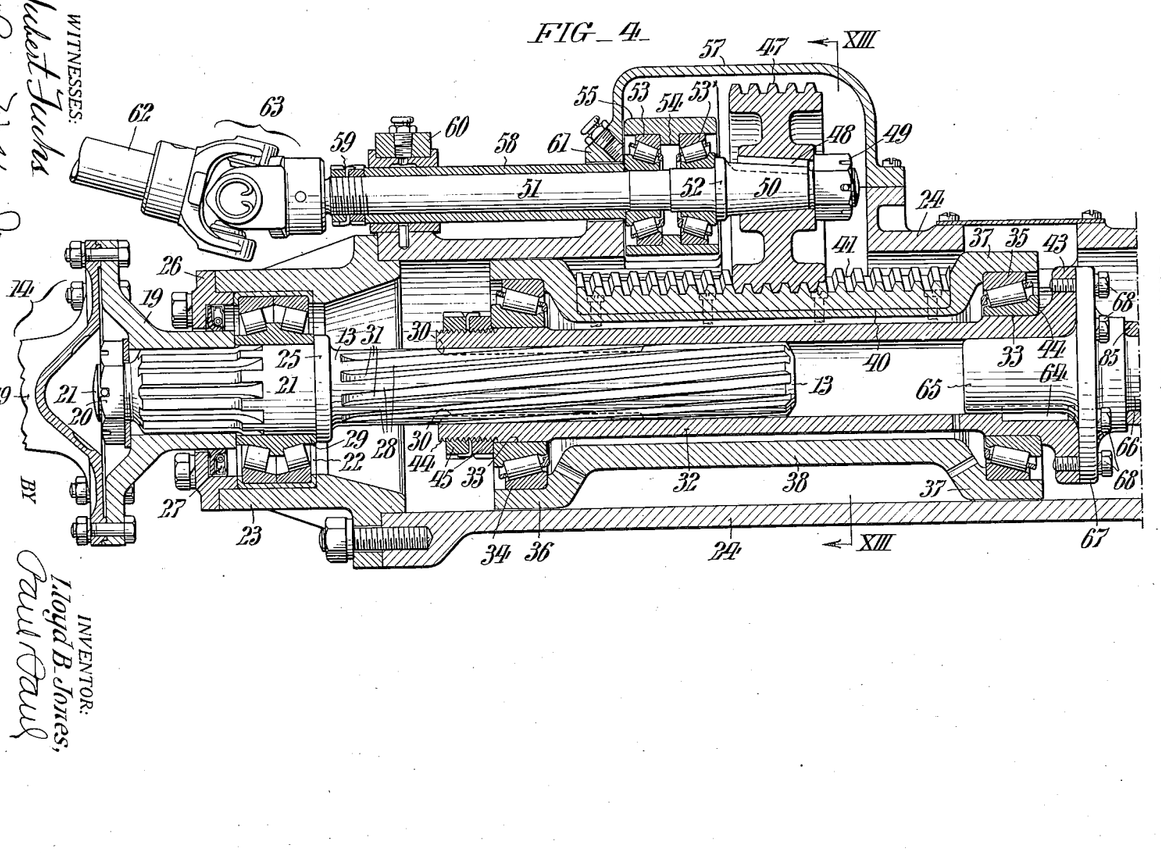
Fig. 4 is a further enlarged scale longitudinal section of the major portion of the preceding view, said section clarifying several details obscured, or not seen, in Fig. 3.

Referring now to Figs. 2–8 which more particularly illustrate the structure of the instant inventive subject matter, the coupler 16, from the locomotive driver axle, is rigidly secured to the stub shaft 15 carrying the slip-joint portion 18, see Figs. 3 and 4 to best advantage, of the universal 14, whereas the companion rigid portion 19 is appropriately secured by a lock nut 20 to the outer screw-threaded end portion 21 of the spline 13, said portion 21 being rotative in a double roller bearing 22, in the cylindrical end section 23 of the cam shaft housing rear portion 24, intermediate a shoulder or collar 25 on said shaft portion 21 and a cupped cap 26, while such cap preferably contains a suitable oil seal device 27. The portion of the spline shaft 21 forwardly beyond the collar 25, or to the right-hand in Fig. 4, is provided or formed with helical splines 28 for a purpose hereafter set forth, while it is rotated by the universal 14 from the couper 16, and is prevented from longitudinal movement by the inner race member 29, of the roller bearing 22, being secured between the collar 25 and the inner end of the rigid portion 19 of the universal 14, in an obvious manner.

Cooperative with the spline 13, by means of inwardly directed feathers or complemental splines 30 meshing the grooves 31 of the helically splined section 28 of said shaft 13, is a sleeve 32, hereinafter termed the spline sleeve, which embodies diametrically enlarged seat portions 33, proximate the respective ends, for the inner race components of reversely-inclined roller bearings 34, 35. These bearings 34, 35 are preferably fitted in the expanded ends 36, 37 of a concentrically related bearing or rack sleeve 38 which is free to be longitudinally moved in the housing portion 24, but is restrained from relative rotation by suitable key means 39, see Fig. 13. The rack sleeve 38 is formed with a longitudinal flat 40, intermediate the ends 36, 37, for rigid attachment of a worm rack 41 as by bolt means 42, and later on again referred to in connection with the associated mechanism for effecting manual cut-off adjustments and reversals. The spline sleeve 32 is provided at one extremity, the left as viewed in Fig. 2 and the right as seen in Figs. 3 and 4, with a flange 43 and a shoulder 44, the latter serving as an abutment for the inner race component of the roller bearing 35, whereas the other extremity of said spline sleeve 32 is screw-threaded at 44, for application of lock nuts 45 in abutment with the inner race component of the roller bearing 34, as readily understandable from Figs. 3 and 4, whereby the spline sleeve 32 and rack sleeve 38 are firmly restrained against relative longitudinal movement.

Figures 9, 10, 11, 12, 13:
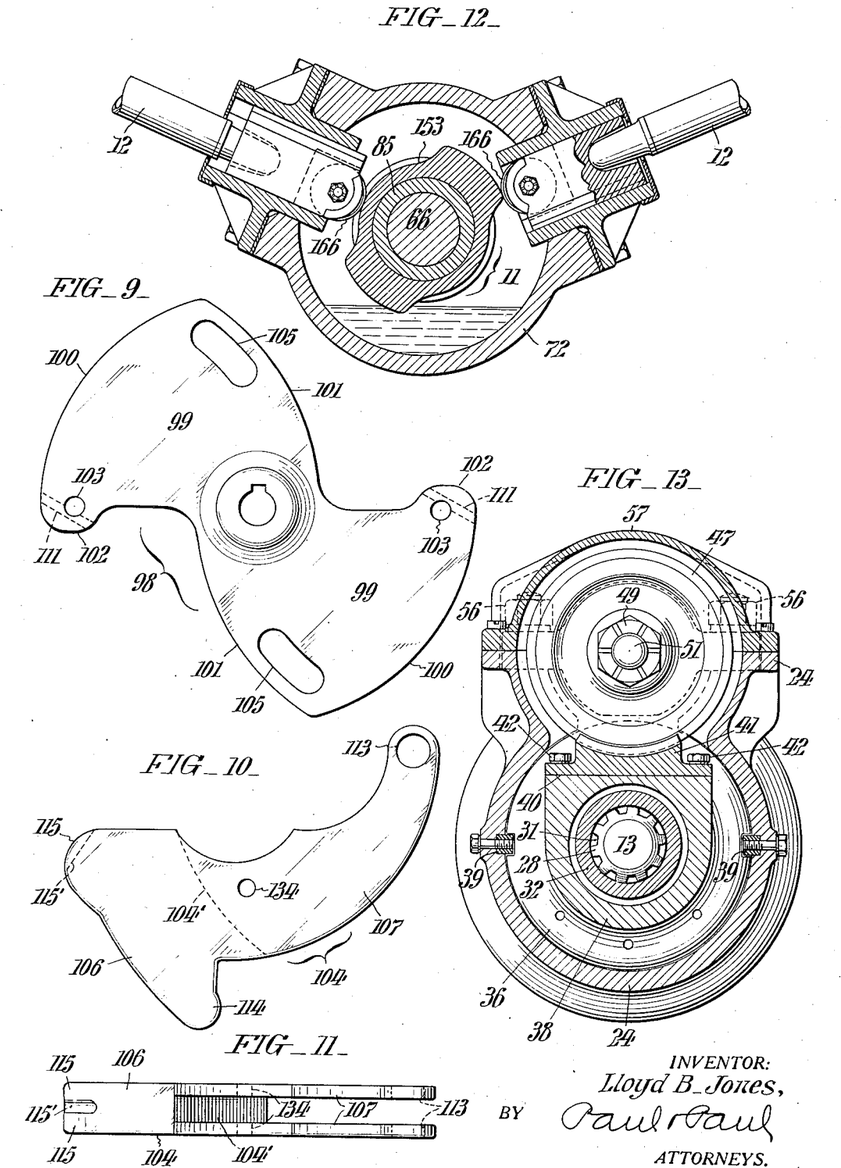
Fig. 9 is a detail view of the governor driving component or plate, hereinafter fully explained.
Fig. 10 is a side view of one of the governor device weight members or arms.
Fig. 11 is a plan view looking downwards, from above, of the preceding figure.
Fig. 12 is a cross-section on the plane indicated by the angle arrows XII—XII in Fig. 1.
Fig. 13 is a cross-section taken as designated by the angle arrows XIII—XIII in Figs. 3 and 4.
Figure 14:
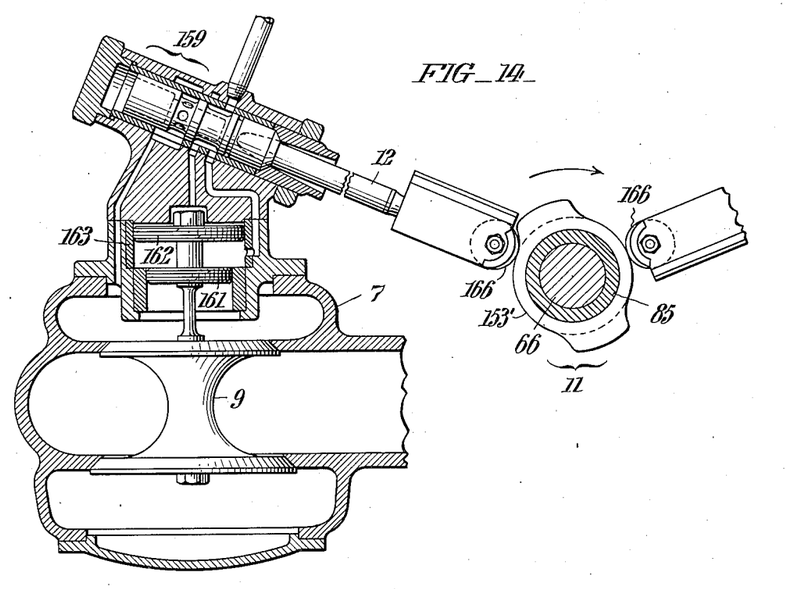
Fig. 14 is a vertical mid-and-broken section through one of the main motive fluid admission valves such as indicated in Fig. 1, together with the associated push-rods and master control cam, said section being taken approximately as indicated by the dot-and-dash lines and arrows XIV—XIV in said Fig. 1, but drawn to larger scale for purposes of clarity.
Figure 15:
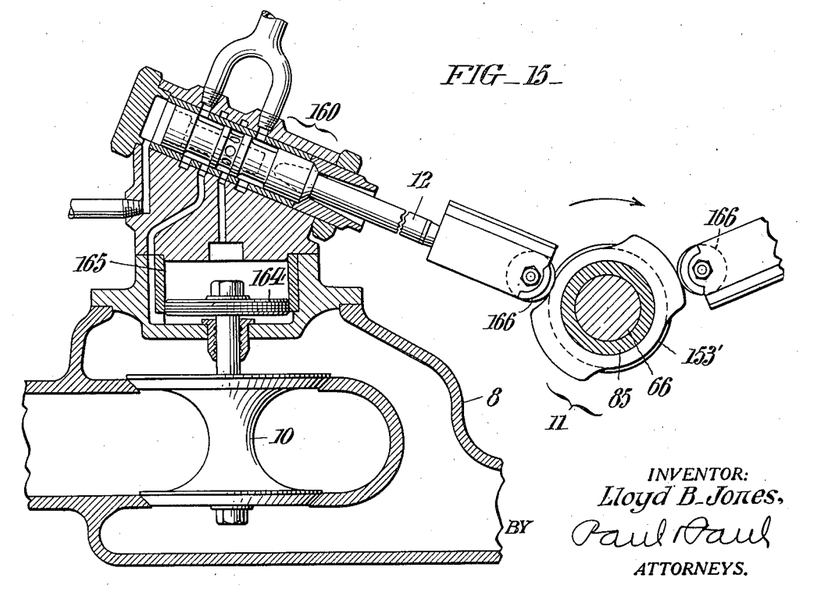
Fig. 15 is a similar view to the preceding, of one of the fluid exhaust valves, but taken on the plane XV—XV of Fig. 1.
Figure 16:
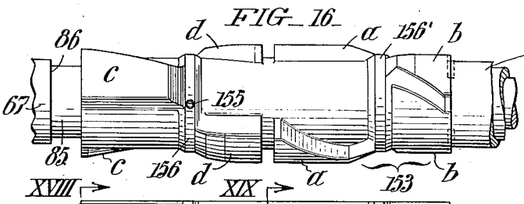
Fig. 16 is a detail view of the cam controlling the rear admission and exhaust valves, or that at the left-hand mid-region of Fig. 1.
Figure 17:
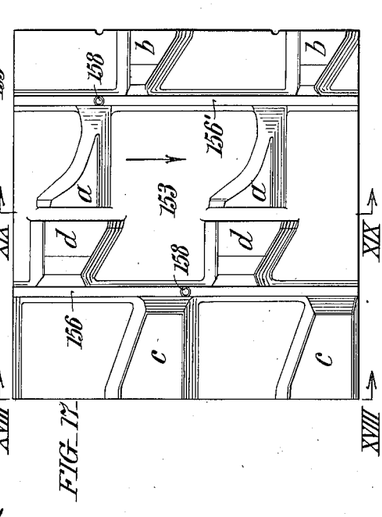
Fig. 17 is a linear development of the outer or camming surface of the preceding figure.
Figure 18:
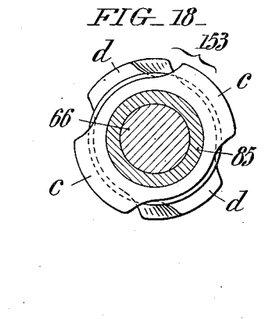
Fig. 18 is an end view of the cam or looking in the direction of the angle arrows XVIII—XVIII at the left-hand of Fig. 17.
Figure 19:
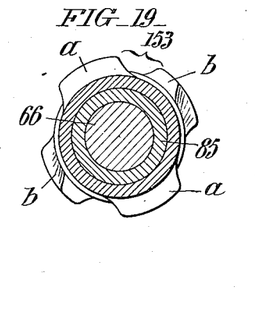
Fig. 19 is a cross-section on the plane designated XIX—XIX in Fig. 17.
Figure 20:
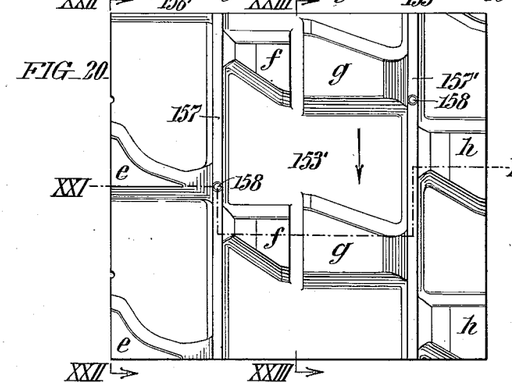
Fig. 20 is a linear development, similar to Fig. 17, of the cam controlling the forward admission and exhaust valves, or that at the right-hand mid-region of Fig. 1.
Figure 21:
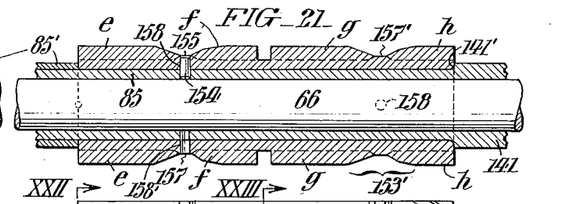
Fig. 21 is a staggered section taken approximately on the plane designated XXI—XXI in Fig. 20.
Figure 22:
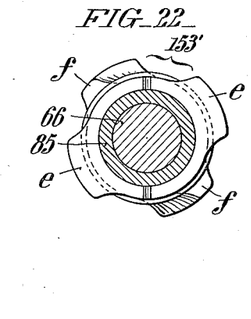
Fig. 22 is an end view taken as indicated by the arrows XXII—XXII in Fig. 20; and, Fig. 23 is a cross-section on the plane XXIII—XXIII of Fig. 20.
Figure 23:
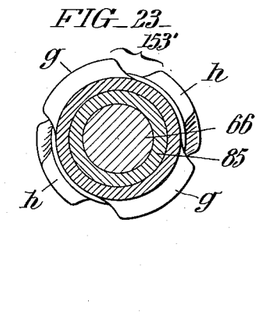

Meshing the rack 41 is a worm gear 47 rigidly secured, by a key 48 and lock nut 49, to the forward taper end 50 of a rotatable shaft 51 having a collar 52 abutting the confronting rear end or outer face of a pair of reversely inclined roller bearings 53, 53', said bearings being conveniently spaced apart by an intervening annular projection 54 of a common retainer 55, attached to the housing portion 24 by clamp bolts 56, see Figs. 3 and 13, and to which access is had through a removable cover 57. The shaft 51 is fitted with a sleeve 58 conveniently clamped between the confronting inner race of the roller bearing 53 and lock nuts 59 on said shaft, while the shaft 51 and sleeve 58 are journaled in appropriate bearings 60, 61, respectively, mounted on the housing portion 24 and through the cover 57, as clearly apparent from Fig. 4. The shaft 51 is preferably rotative through the medium of a hand-wheel in the locomotive cab, both not shown, by means of a coupling connection 62 and universal 63, in an obvious manner.

Fitting in the forward end of the spline sleeve 32, and restrained against relative rotation by a key 64, Fig. 4, is the stub-like section rear portion 65 of an axially aligned drive shaft 66, said shaft having a flange 67, rigidly secured to the spline sleeve confronting flange 43 by appropriate means 68, so that when the rack sleeve 38 is moved longitudinally said spline sleeve 32 and drive shaft 66 are jointly shiftable angularly, about their common axis, with respect to the driving spline 13, as hereinafter fully explained.

Figure 5:
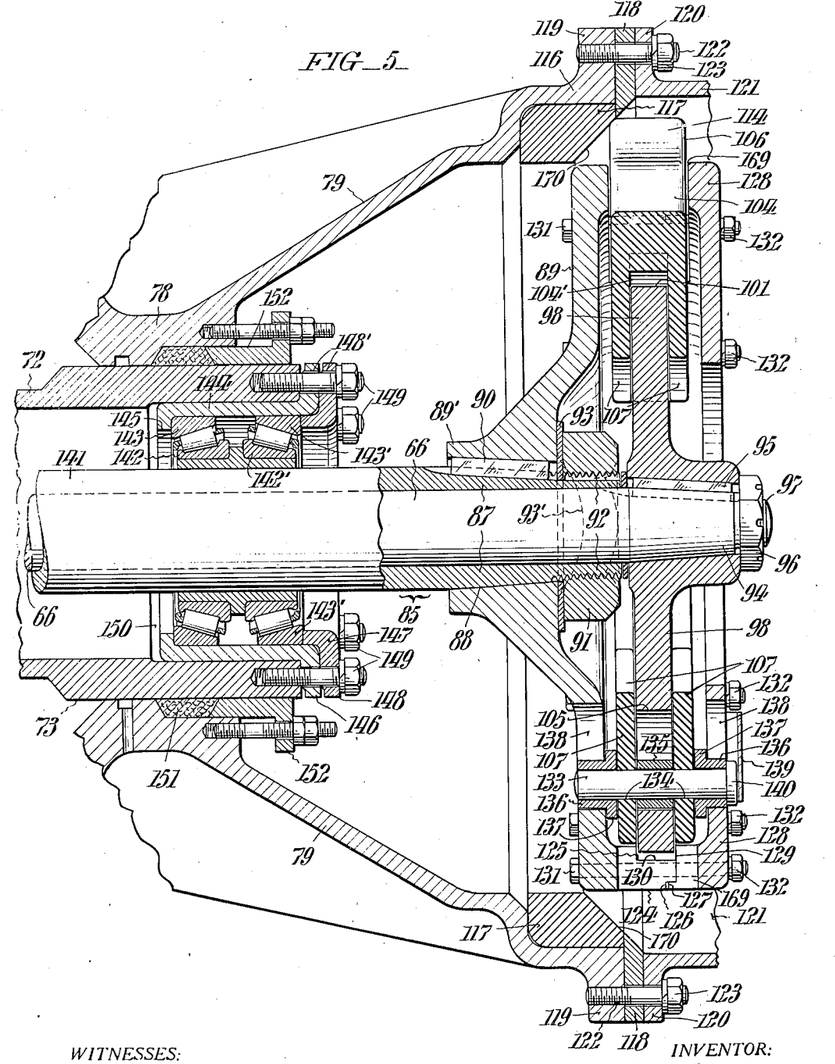
Fig. 5 is a still further enlarged scale longitudinal section through the centrifugal or governor device of this invention.

At this juncture it is to be noted that the cam housing rear portion 24 is provided at the forward end, the right-hand in Fig. 2, with a flange 69 to which is attached, by securing means 70, the complemental flange 71 of an extension or main housing portion 72 having its other end enlarged at 73, Figs. 2 and 5. The flanges 69 and 71 snugly fit an aperture 74, Fig. 2, in the cylinder saddle rear wall 75, with attachment to the latter, by appropriate means 76, and an interposed sealing gasket or washer 77. On the other hand, the forward or enlarged end 73 of the housing main portion 72 passes through a gland section 78 of the casing component 79 for the centrifugal device or governor 17 of this invention, said component having a rear flange 80, with an inner lip 81 engageable in a corresponding orifice 82 of the front cylinder saddle wall 83, and attachment, rigidly, thereto by appropriate securing means 84.

Fitting the drive shaft 66, Fig. 2, with capacity for limited relative rotation, is the tubular cam shaft 85, said cam shaft being restrained against longitudinal displacement by abutment at one end against the stepped part 86 of the drive shaft flange 67, and at the other by a somewhat frusto-conical terminal portion 87 fitting the complementarily tapered bore 88 of the hub-section 89' of the governor housing component 89. An interengaging key 90 and clamp nut 91, applied to a screw-threaded extension 92 of the terminal portion 87 serves to secure the parts 85, 89 in rigid assembly; while an appropriate washer 93, between the clamp nut 91 and the forward inner face of the housing component 89, has opposed segmental portions 93' thereof, outwardly-bent, in abutment with parallel faces of the nut 91 to positively lock the latter against displacement.

Permanently fixed to the tapering end portion 94 of the drive shaft 66, by a key 95, and a lock nut 96 on the diametrically reduced screw-threaded extremity 97 of said shaft, is a driving member or plate 98, shown in detail in Fig. 9. This driving plate 98 embodies complemental opposingly-directed lobes 99 of special and corresponding contour; that is to say, each lobe 99 includes differentially curved edges 100, 101, the former 100 being, preferably, struck from the axis of rotation of the plate 98 and the latter 101 from the respective axes of diametrically-related opposing apertured ears 102, the orifices 103 of which afford pivotal connection for special governor weights, comprehensively designated 104, and one of which is shown in detail by Figs. 10 and 11. In addition, each lobe 99 is provided with an arcual slot 105 in the region of said lobe where the curved edges 100, 101 converge, and preferably of a contour concentrically paralleling the curvature 101, for a purpose later on clarified.

Figures 6, 7, 8:
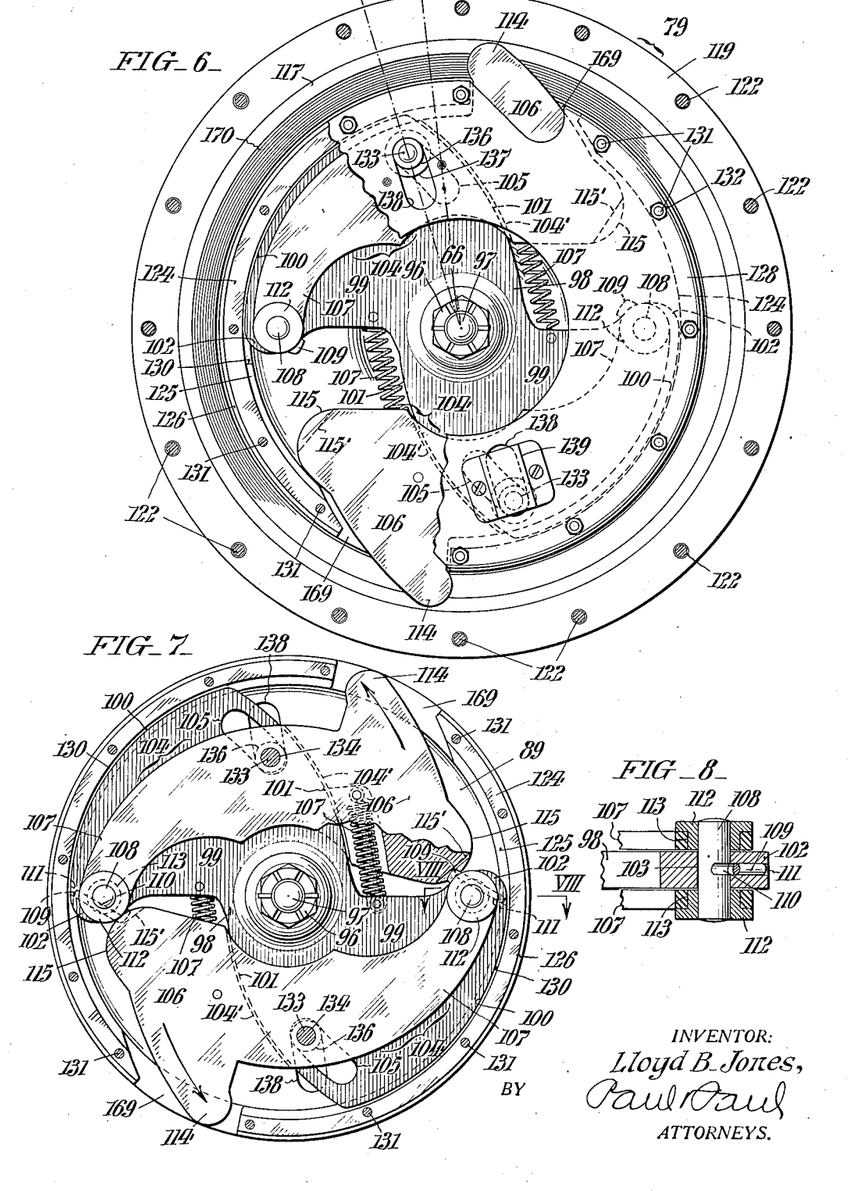
Fig. 6 is an end view of the centrifugal governor device with a casing component removed, said view being taken approximately in the direction of the zigzag arrows VI—VI in Fig. 2, with the governor weights in active position.
Fig. 7 is a corresponding view, to the preceding, of the centrifugal or governor device with the governor weights fully retracted.
Fig. 8 is a detail section on the plane desinated by the angle arrows VIII—VIII in Fig. 7.

Each governor unit 104, seen to best advantage in Figs. 10 and 11, preferably consists of an approximately crescent-shaped element embodying a solid section or weight 106 with parallel arms 107 projecting therefrom, said arms being adapted to freely flank the driving plate lobes 99, when fulcrumed to an apertured ear 102, by a stud 108, Figs. 2, and 6–8, which is restrained against rotary and axial movement by a cotter pin 109, engaged in a chord groove 110 across said pin, Figs. 6–8, and which is drifted into corresponding holes 111, Figs. 7–9, tangential to the orifice 103 through the apertured ear 102. Pivotal coupling of the arms 107, to the pin 108, is effected by axially aligned flanged sleeves 112, having a force fit in apertures 113 at the fulcrum ends of said arms. It is to be noted that each governor unit 104, curves out at 104', Figs. 10 and 11, in conformity with the driving plate curvature 101 for compacting said parts when relatively collapsed, see Fig. 7, and it is provided with an outwardly directed projection or horn 114 as well as an inwardly active rounding 115 having a tangential groove 115', Figs. 6, 7, 10 and 11, the purposes of which will be later on set forth: whereas the groove 115' affords clearance for the head of the cotter pins 109 when the units 104 are fully retracted, or at rest, as clearly understandable from Fig. 7, more particularly.

Referring again to the casing 79 for the centrifugal governor 17, as will be seen to best advantage in Fig. 5, the same includes an annular forward section 116, in which is fitted an appropriate flared filler ring 117 held in position by a mergingly-related clamp ring 118, intermediate the flange 119 of said casing and the confronting flange 120 of an extension closure 121, such closure being sealingly secured in place by screw bolts 122 with appropriate locking devices 123.

The governor housing component 89 also embodies a cylindrical forward section 124, having a concentric inner recess 125, and an outer circumferential groove 126, in which snugly fits the surrounding lip 127 of an angle-section annulus 128, the stepped inner part 129 whereof forms, with the recess 125 aforesaid, a medial groove 130 co-planarly related in respect to the driving plate 98 and weight unit horns 114, while through bolts 131, having lock means 132, connect the parts 89 and 128 in rigid assembly.

In order that the governor housing assembly 89, 128 may be rotated by the driving plate 98, use is made of diametrically spaced stud pins 133, Figs. 5–7, drifted through axially aligned holes 134, in the governor unit parallel arms 107, each such pin 133 being fitted with a medially located rotary guide sleeve 135 coactive with the associated arcual slot 105 of said driving plate 98. The stud pin 133 is also fitted with spaced rotary guide rollers 136, having flanges 137, located intermediate the confronting end walls of the governor casing components 89, 128 and the adjacent outer faces of the governor arms 107. These rollers 136 engage the radial registering grooves 138 of the respective components 89, 128 for a purpose hereafter explained, whereas a suitable guard 139 may be secured to the casing components 128, facing the head 140 of each pin 133, to safeguard the latter from longitudinal displacement.

The forward part 141, Figs. 2 and 5, of the tubular cam shaft 85 is fitted with reversely inclined roller bearings 142, 142', the outer race components 143, 143' being mounted in a tubular member 144, having an inner lip 145, Fig. 5, for abutment by the race component 143, and an outer flange 146, whereas the outer race component 143' is engaged by an elbow section clamp ring 147, the flange 148 whereof corresponds to the flange 146, and both of said flanges have circumferentially spaced registrable holes 148' for passage of lock means 149 whereby the bearings 142, 142', with the associated parts above described, are secured in the slightly increased bore 150 of the cam shaft enlargement 73; and said enlargement is also fitted with a packing 151, held in place by a gland 152, as readily understandable by those conversant with the art.

Referring, again, to the tubular shaft 85, the same is fitted with spaced rear and front cam devices 153, 153', Figs. 2 and 16–23, for actuating the associated poppet valve rods 12, each such device being preferably sleeve-like and rigidly secured in place by radially-directed taper pins 154. These pins 154 have the inner ends approximately flush with the interior surface of the bore of the tubular cam shaft 85, or they are not projected into frictional contact with the drive shaft 66, and their outer ends 155 are finished-off even with the outer surface of the cam devices 153, 153'.

The rear cam device 153, see Figs. 16-19 to best advantage, preferably, embodies diametrically opposed admission controlling projections $a$, $b$, and rectangularly related exhaust controlling projections $c$, $d$, whereas the front cam device 153', Figs. 20-23, includes correspondingly opposed admission controlling projections $e$, $f$, and rectangularly related exhaust controlling projections $g$, $h$. The rear and front forward motion admission controlling cam projections $a$, $e$, are each of somewhat triangular contour, while the backward motion admission controlling cam projections $b$, $f$, are of approximately trapeziform outline, whereas all of the forward and backward motion exhaust controlling cams $c$, $d$ and $g$, $h$ are of longitudinally and laterally directed substantially trapeziform contour; and said cams are coactive with the slidable rods 12, while all of said cams have identical "approach" and "trailing" faces. Rear and front dead center circumferential sections 156, 156', 157, 157', respectively intervene the exhaust and associated admission diametrically opposing cam projections $a$—$b$, $c$—$d$, $e$—$f$, and $g$—$h$, and through these sections diametrically aligned holes 158, see Fig. 21, for the taper pins 154, are drilled with the one portion 158' left open as a means for ingress of lubricant to the drive shaft 66, while the respective cam devices or sleeves 153, 153' are positionally spaced on the tubular shaft 85 by the latter abutting the shoulder 141' afforded by the forward enlarged portion 141 of said shaft—see Fig. 2 to best advantage, and an intervening sleeve 85', all as readily understandable by those conversant with the art.

The slidable rods 12, preferably, as set forth in the hereinbefore referred to Patent No. 2,260,458, respectively operate pilot valves 159, 160 controlling the admission and exhaust poppet valves 9 and 10, said valves 9 having differential actuating pistons 161, 162 in a cylinder 163, and the valves 10 a single operating piston 164 in a cylinder 165. The respective rods 12 are provided with rollers 166 for coaction with the associated cam projections $a$—$h$, all substantially in accordance with the disclosure set forth in the prior patent, above identified.

Having clarified the structural features of this invention and bearing in mind that steam actuated poppet valves, such as the valves 9, 10, have a constant time lag between the movement of the respectively associated pilot valves 159, 160 and the movement of said poppet valves, the result is that the angular lag of each valve, expressed in degrees of rotation of the locomotive wheels, increases in proportion to the speed. This increasing lag, in proportion to speed, is effectively overcome by the centrifugal governor 17 of this invention, inasmuch as the housing 89, 128, being rotated by the driving plate 98 through the medium of the pins 133, which are tight in the governor weight arms 107, has capacity for conjoint arcual radial movement in the slots 105, 138 by guidance of the sleeves 135 and flanged rollers 136. As a result, when the governor units or weights 104 swing outwards under increasing velocity, the said governor housing 89, 128 will be advanced in an angular direction with respect to the driving plate 98. This angular advance of the housing 89, 128, relative to the driving plate 98 is, preferably, confined to a movement of approximately ten degrees, as typically indicated by the broken lines and associated arrow $y$ in Fig. 6, although said advance may be according to other desirable service conditions, and simultaneously and correspondingly advances the tubular cam shaft 85 with respect to the drive shaft 66. As a result of angularly advancing the tubular shaft 85, the lead of the several cams $a$—$h$ and the pilot valves 159, 160 is correspondingly increased with the increase in speed of the locomotive, whereby any tendency of the poppet valves 9, 10 to "lag," in terms of angular rotation with respect to the locomotive wheels, is positively overcome.

It will also be further understood from the foregoing description that, in order to shorten the cut-off of the respective poppet valves 9, 10, the cams 153, 153' can be advanced by the engineer simply rotating the shaft 62 from the locomotive cab which, through the medium of the universal 63, shaft 51, worm gear 47, rack 41, spline sleeve 32 and bearing sleeve 38, effects corresponding and simultaneous advancement of the drive shaft 66, cam shaft 85 and cams 153, 153' to bring about the desired cut-off. The full-forward and full-reverse limits of movement of the centrifugal governor 17, which effects automatic lead adjustments proportional to the locomotive speed are, respectively, indicated by broken lines 167 and 168 in Fig. 2.

It is to be also remarked, the governor 17 is primarily designed for operation when the locomotive, not shown, is running forward. Accordingly, when the governor weights 104 come into operation as the locomotive is running backwards, the angular shift of the cams $a$—$h$ would be in reverse, and the beforedescribed operations retarded as the locomotive speed increased. To overcome such retarding action and prevent the governor device 17 from functioning when the locomotive is running in reverse, the governor weight projections or horns 114 are provided, said projections normally swinging outwards through circumferential slots 169, Fig. 7, in the casing component forward section 124. When the locomotive valve motion is placed in reverse, the projections or horns 114 will move into contact with the flaring face 170 of the filler ring 117 whereby the governor weights 104 are prevented from outward movement under centrifugal action. Springs 171, Figs. 6 and 7, normally influence the governor weights 104 inwardly, so that they are automatically retracted when the governor device 17 is at rest.

From the foregoing disclosure it is considered that the merits and advantages of this invention will be clear to those conversant with the art. Furthermore, while experience has demonstrated that the organization illustrated by the drawings is a practical and efficient embodiment for accomplishing the ends sought by this invention, such typified construction, however, may be varied in detail without departing from the spirit and scope of said invention as more concisely expressed in the following claims.

Having thus described my invention, I claim:

1. In a fluid operated reciprcoating engine having cylinders with individual inlet and exhaust valves, and associated cam actuated means for opening and closing said valves, the combination of a centrifugal control device for effecting automatic adjustments of the opening of such valves simultaneously with speed variations of the engine; and manually operable means, including a helical-spline connection, for changing the lead of said valves concurrently with adjustments of the cut-off.

2. In a locomotive engine the combination with with cylinders at opposite sides of said engine, and means driven by pistons reciprocating in said cylinders, of motive-fluid inlet and exhaust valves for each cylinder; a cam shaft and means actuated thereby for shifting said valves to control admission and exhaust of motive-fluid into and from the engine cylinders; and a continuously rotatable governor device with an associated helical-spline means for, respectively, effecting automatic adjustments of the opening of the valves concurrently with forward speed variations of the locomotive, and for changing the lead of said valves with manually effected cut-off variations.

3. In a locomotive engine front end structure having cylinders at opposite sides thereof, and means driven by pistons reciprocating in said cylinders, the combination of motive-fluid inlet and exhaust valves for each cylinder; a cam shaft with means actuated thereby, for shifting said valves to control the admission and exhaust of motive-fluid into and from the engine cylinders; a continuously rotatable centrifugal device operatively coordinated with the piston driven means, including mechanism for effecting automatic lead adjustments of said valves with forward speed variations of the locomotive; and manually operable means, involving a helical-spline, for angularly shifting the cam shaft and the centrifugal device concurrently, whereby cut-off changes for the valves are obtained.

4. In a locomotive engine front end structure having plural cylinders, and means driven by pistons reciprocating in said cylinders, the combination of steam inlet and exhaust valves with associated pilot devices for shifting said valves to control the admission and exhaust of steam to and from the engine cylinders; a cam shaft with a housing at one end thereof; mechanism operatively coordinating the cam shaft to the piston driven means for imparting continuous rotation to said cam shaft; a centrifugal device in the housing including means effective to angularly advance the housing and cam shaft jointly, relative to their common axis of rotation, for automatically adjusting the pilot devices with forward speed variations of the locomotive, whereby lag of the valves aforesaid is positively prevented; and manually operable means, including a helical-spline, for angularly shifting the cam shaft and the centrifugal device concurrently, to effect cut-off variations for the said valves.

5. In a locomotive engine front end structure including cylinders at opposite sides thereof, and means driven by pistons reciprocating in said cylinders, the combination of steam inlet and exhaust poppet valves having associated pilot devices for shifting said valves to control the admission and exhaust of steam to and from the engine cylinders; a cam shaft having a housing at one end; mechanism operatively coordinating the cam shaft to the piston driven means for imparting continuous rotation to said cam shaft; a centrifugal governor device in the housing including means effective to angularly advance said housing and cam shaft jointly relative to their common axis of rotation, for automatically adjusting the pilot devices in conformity with forward speed variations of the locomotive, whereby lag of the poppet valves is positively prevented; means to restrain the centrifugal governor from activity when the locomotive is running backwards; and manually operable means, involving a helical-spline connection, for axially shifting the cam shaft and the centrifugal governor concurrently to effect cut-off variations of the poppet valves.

6. In a locomotive engine front end structure including the saddle with cylinders at opposite sides thereof, and means driven by pistons reciprocating in said cylinders, the combination of steam inlet and exhaust poppet valves having associated pilot devices effective to shift said poppet valves for controlling the admission and exhaust of steam to and from the engine cylinders; a driver shaft; a tubular cam device on said driver shaft having a housing at one end; mechanism at the other end of the driver shaft, including a helical-spline, operatively coordinating the driver shaft to the piston driven means for imparting continuous rotation to said driver shaft; a centrifugal governor mounted on the driver shaft within the cam device housing; said governor including means operative to angularly advance said housing and cam shaft jointly, relative to their common axis of rotation, for effecting automatic adjustment of the pilot devices with forward speed variations of the locomotive, whereby lag of the poppet valves is positively prevented; means to restrain the governor from angularly retarding the housing and cam shaft when the locomotive is running backwards; and manually operable means engaging the helical-spline for jointly shifting the cam shaft and centrifugal governor longitudinally relative to said spline for effecting cut-off variations of the poppet valves.

7. A cam drive, for controlling the operation of motive-fluid inlet and exhaust valves of locomotive engine cylinders, comprising a composite structure including a solid shaft with a tubular extension at one end, said extension having a portion of the bore helically-splined; a cam sleeve on the solid shaft; means permitting said sleeve to have a limited degree of rotation with respect to the solid shaft; means restraining the cam sleeve against longitudinal movement; means, including a splined driver member, for imparting continuous rotation to the solid shaft; and said driver member embodying a section engaged in the helically-splined bore portion of the shaft tubular extension, whereby the composite structure is shiftable longitudinally to impart a limited degree of relative rotation to the cam sleeve aforesaid.

8. The cam drive as set forth in claim 7, wherein the cam sleeve is in the form of a tubular shaft having a diametrically enlarged portion at one end defining a shoulder; rear and front sleeves on said shaft with an intervening spacer; diametrically-opposing admission and exhaust controlling projections on each sleeve; the rear and front forward-motion admission-controlling projections being of substantially triangular contour, the backward-motion admission-controlling projections of approximately trapeziform outline, the forward and backward-motion exhaust-controlling projections of longitudinally and laterally directed trapeziform contour, and all of said projections have identical "approach" and "trailing" faces; circumferential dead-center sections about the sleeves respectively intervene the exhaust and associated admission diametrically-opposing projections; and means through said dead-center sections rigidly secure the respective sleeves to the tubular shaft aforesaid.

9. The cam drive as defined in claim 7, wherein the splined driver member comprises a shaft embodying a plain section intermediate a helically-splined portion and a longitudinally splined portion, a bearing affording rotary support for the shaft plain section, means restraining the shaft against longitudinal movement, and means whereby the splined portion of said shaft is operatively connected with a driven part of the locomotive engine, for continuous rotation by the latter.

10. The cam drive as defined in claim 7, wherein the composite structure extension is in the form of a tubular shaft section having diametrically enlarged portions proximate the respective ends; reversely inclined roller bearings seat on each enlarged portion of said shaft section; a rack sleeve is mounted on the outer race components of the roller bearings; means to restrain said rack sleeve from rotation relative to the tubular shaft section; means rigidly clamp the inner race components of the roller bearings to the shaft section; means, under remote control, whereby the rack sleeve and tubular shaft section are longitudinally shiftable; and means rigidly secures the tubular shaft section to the cam drive solid shaft.

11. The cam drive as defined in claim 7, wherein a concentric casing affords housing for the composite structure; means attach said housing to the rear and front walls of the cylinder saddle structure of the locomotive; and a thrust bearing in the forward end of said housing affords joint rotary support thereat for the cam sleeve and the composite structure.

12. In a locomotive front end including the saddle structure and associated cylinders, inlet and exhaust valves for said cylinders, and means driven by pistons reciprocating in said cylinders, the combination of a driver shaft; a concentric tubular camming device; mechanism operatively coordinating one end of the camming device to the piston driven means for continuous rotation thereby, said means including a helical-spline connection; a housing rigid with the other end of the camming device; and governor means in said housing operative by an actuator member fast on the associated end of the driver shaft to effect automatic shifting of the inlet and exhaust valves concurrently with forward speed variations of the locomotive.

13. In a locomotive front end including the saddle structure and associated cylinders, inlet and exhaust valves for said cylinders, and means driven by pistons reciprocating in said cylinders, the combination of a driver shaft, a concentrically related tubular camming device; mechanism operatively coordinating one end of the camming device to the piston driven means for continuous rotation thereby, said mechanism including a helical-spline connection; a housing rigid with the other end of the camming device; centrifugal governor elements in said housing operative by a plate member fast on the associated end of the driver shaft to effect automatic shifting of the inlet and exhaust valves concurrently with forward speed variations of the locomotive; and an enclosure casing for the governor including means effective to prevent expansion of the governor elements when the locomotive is running backwards.

14. The combination of claim 13, wherein the tubular camming device is rotatively mounted in a concentric housing having connection at one end into the governor enclosing casing; and means whereby said housing and casing are respectively attached to the rear and front wall portions of the locomotive cylinder saddle structure.

15. A centrifugal governor device, for automatically controlling the operation of steam inlet and exhaust valves of locomotive engine cylinders, comprising a continuously rotative shaft and a tubular cam shaft concentric therewith, a flat driving member, at one end of the continuously rotative shaft, embodying opposingly-directed corresponding-contoured lobes; complemental governor units opposingly pivoted to the driving member, each said unit being of approximately crescent-shape and embodying a solid section with parallel arms for close compacting with the driving member lobes when mutually collapsed; means effective to influence the governor weights inwardly when the centrifugal device is at rest; a housing for the centrifugal device secured to the associated end of the tubular cam shaft; and means operative to effect conjoint angular advancement of the housing and cam shaft under centrifugal action of the governor units.

16. A centrifugal device, for automatically controlling the operation of steam inlet and exhaust valves of locomotive engine cylinders including a continuously rotative shaft and a tubular cam shaft concentric therewith, comprising a flat driving member at one end of the continuously rotative shaft; similarly contoured flat governor weights opposingly pivoted to the driving member, each said weight being of a shape for close compacting with the driving member when mutually collapsed; means effective to influence the governor weights inwardly when the centrifugal device is at rest; a housing for the centrifugal device secured to the associated end of the tubular cam shaft; opposed means transversely of the housing and coactive with the driving member and the governor weights to effect conjoint angular advancement of said housing and the cam shaft relative to the axis of rotation under centrifugal influence; and a stationary flaring section annulus is engageable by the governor weights to restrain the latter from activity when the locomotive is running in reverse.

17. A centrifugal device as defined in claim 16, wherein the flat driving member embodies opposingly directed lobes including mergingly related differential curved edges, one of such edges being struck from the axis of rotation of said member and the other from respectively associated apertured ears which afford pivotal connection for the governor weights, and each said lobe includes an arcual slot in the region where the curved edges merge together.

18. A centrifugal device as defined in claim 16, wherein each governor weight is of somewhat crescent-shape and embodies a weight section with parallel arms extending therefrom, said arms being spaced to flank the driving member when pivoted thereto by a stud engaged through apertures in the outer ends of the parallel arms; and an outwardly directed horn projects from each weight section with an arcually related inwardly active rounding for the purpose set forth.

19. A centrifugal device as defined in claim 16, wherein the pivotal connection of the governor weights to the driving member consists of a stud restrained against rotary and axial movement in the associated apertured ear of said member, and axially aligned flanged sleeves secured in the fulcrum ends of the weight arms afford pivotal bearing for the outer portions of said stud.

20. A centrifugal device as defined in claim 16, wherein the means for effecting angular movement of the housing and tubular cam shaft relative to the axis of the driving member comprise a stud pin drifted through axially aligned holes in the governor weight arms, a medially located guide roller on said pin engages in an arcual slot through the driving member, and spaced guide rollers on said stud pin engage in respectively related radial grooves in parallel walls of the centrifugal device housing.

LLOYD B. JONES.